United States Patent
Seo et al.

(10) Patent No.: US 8,331,763 B2
(45) Date of Patent: Dec. 11, 2012

(54) APPARATUS AND METHOD FOR SYNCHRONIZING REPRODUCTION TIME OF TIME-SHIFTED CONTENT WITH REPRODUCTION TIME OF REAL-TIME CONTENT

(75) Inventors: Jang-seok Seo, Seoul (KR); Sung-hwan Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1279 days.

(21) Appl. No.: 11/654,656

(22) Filed: Jan. 18, 2007

(65) Prior Publication Data

US 2007/0196077 A1 Aug. 23, 2007

(30) Foreign Application Priority Data

Feb. 21, 2006 (KR) .................. 10-2006-0016837

(51) Int. Cl.
H04N 9/80 (2006.01)
(52) U.S. Cl. .................. 386/248; 386/239; 386/249
(58) Field of Classification Search .................. 386/239, 386/248–251; 358/908; 375/240.25
See application file for complete search history.

(56) References Cited

U.S. PATENT DOCUMENTS

| 6,160,950 A * | 12/2000 | Shimazaki et al. ........... 386/249 |
| 6,285,818 B1 * | 9/2001 | Suito et al. .................... 386/249 |
| 7,415,070 B2 * | 8/2008 | Katayama ................. 375/240.25 |
| 7,962,007 B2 * | 6/2011 | Abe et al. ....................... 386/249 |
| 2003/0007777 A1 * | 1/2003 | Okajima et al. ................. 386/46 |
| 2003/0123841 A1 * | 7/2003 | Jeannin ............................ 386/46 |
| 2004/0175094 A1 | 9/2004 | Mautner et al. |
| 2006/0133251 A1 * | 6/2006 | Thangaraj et al. ......... 369/59.17 |

FOREIGN PATENT DOCUMENTS

| JP | 2004-328306 A | 11/2004 |
| KR | 10-2004-0063559 A | 7/2004 |
| KR | 10-2004-0075237 A | 8/2004 |
| KR | 10-2005-0050456 A | 5/2005 |

* cited by examiner

Primary Examiner — Thai Tran
Assistant Examiner — Mishawn Dunn
(74) Attorney, Agent, or Firm — Sughrue Mion, PLLC

(57) ABSTRACT

An apparatus and method are provided for synchronizing a reproduction time of a time-shifted content with a reproduction time of a real-time content. The apparatus includes a tuner/demodulator which tunes broadcasting signals and demodulates the tuned digital broadcasting signals so as to output the broadcasting signals in forms of transport streams, a demultiplexer which demultiplexes the output transport streams so as to divide the transport streams into video data, audio data, and supplementary information and output the video data, audio data, and supplementary information, a data refining unit which removes unnecessary frames from the video data and the audio data, and an HDD which stores the video data and the audio data, from which the unnecessary frames are removed.

14 Claims, 7 Drawing Sheets

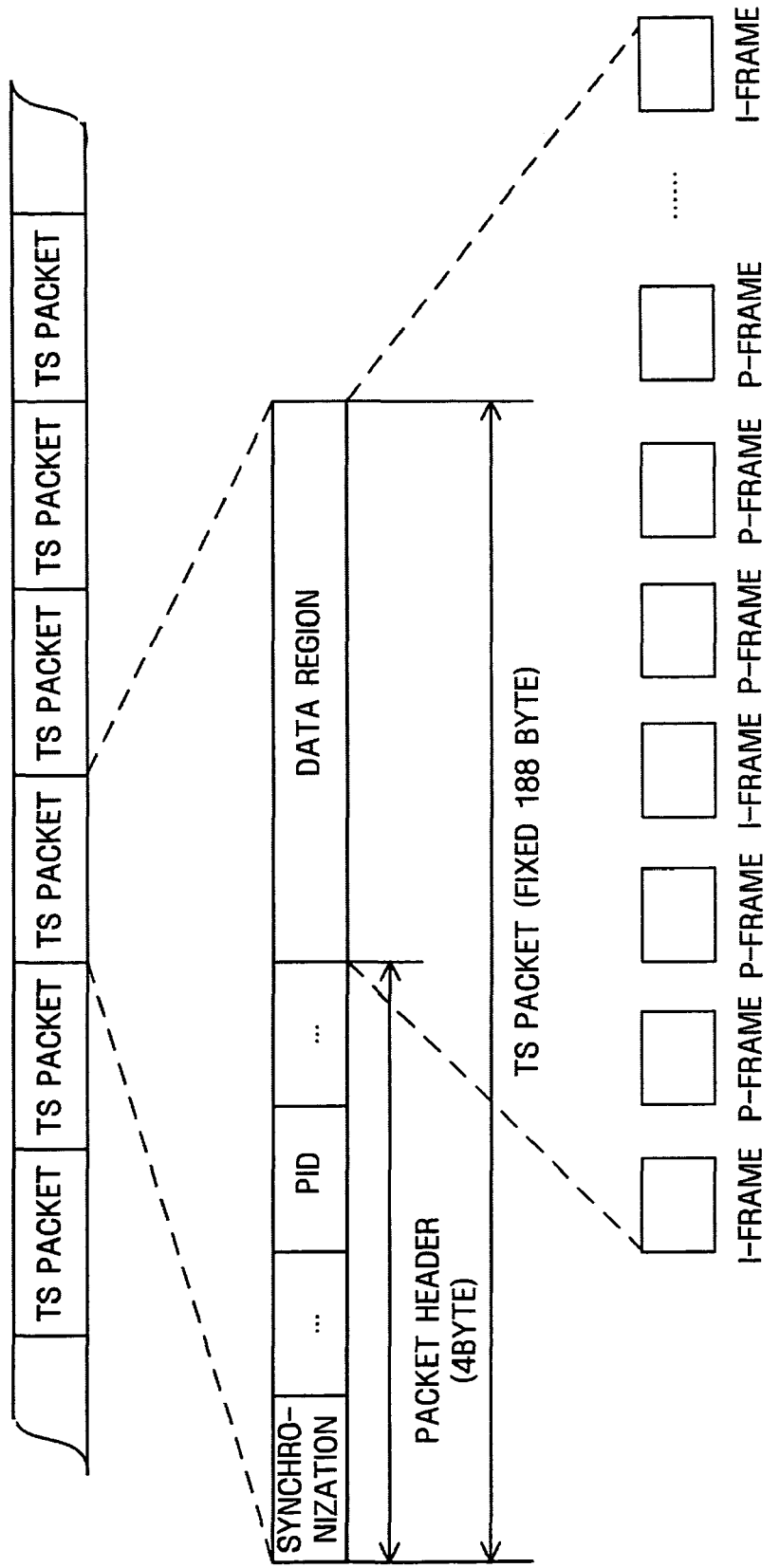

APPARATUS AND METHOD FOR SYNCHRONIZING REPRODUCTION TIME OF TIME-SHIFTED CONTENT WITH REPRODUCTION TIME OF REAL-TIME CONTENT

CROSS REFERENCE TO RELATED APPLICATION

This application claims priority from Korean Patent Application No. 10-2006-0016837 filed on Feb. 21, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to synchronizing a reproduction time of a time-shifted content with a reproduction time of a real-time content, and more particularly, to performing a process of refining a recorded content such that a reproduction time of a content recorded using a time-shift function is synchronized with a reproduction time of a real-time content.

2. Description of the Related Art

A Personal Video Recorder (PVR) system is a personal digital video recorder that stores digital broadcasting contents in a nonvolatile memory, such as a hard disk drive (HDD) and so on, converts satellite broadcasting contents into digital signals and stores the converted digital signals, and outputs and reproduces the contents on a monitor, such as a television (TV), as needed. Unlike video cassette recorders (VCRs) which store image signals in a magnetic tape, the PVR system is a novel digital recorder that stores information in a hard disk and reproduces the information. That is, the PVR can record broadcasting programs corresponding to a predetermined time using the internal hard disk drive of the set-top box or main body of a (TV). At this time, data is stored in the HDD after being encoded in an Moving Picture Experts Group (MPEG)-2 system and the stored data is output after being decoded in the MPEG-2 system for reproduction.

That is, the PVR system converts digital broadcasting data (Europe: DVB, Korea/Japan/North America: ATSC) or analog broadcasting data (Europe: PAL, Korea/Japan/North America: NTSC) received through a broadcasting channel of a TV system into digital signals using a central processing unit (CPU) and a video signal processor. Then, the PVR system converts the digital signals into digital signal data and stores the converted digital signal data in an internal memory (HDD) of the system, performs analog-to-digital (A/D) conversion of the stored digital signal data, and reproduces the A/D converted data on a display device or a screen at a desired time according to a desired method selected by a viewer.

FIG. 1 is a block diagram illustrating a PVR system according to the related art.

As shown in FIG. 1, the PVR system includes a tuner/demodulator 10 which selects a desired channel and converts selected digital broadcasting signals into transport streams (TS), a demultiplexer 20 which divides the transport streams converted by the tuner/demodulator 10 into images, sound, and data, an HDD 40 which stores the images, sound, and data streams, a CPU 30 which controls storage of the divided images in the HDD 40, and an MPEG2 decoder 50 which decodes the data streams received from the tuner/demodulator 10 or the data streams stored in the HDD 40 into images and sound, and processes the data streams to be output through a screen and a speaker.

The PVR system has a broadcasting program reserving/recording function and a time-shift function. Here, the time-shift function stores stream buffers of a broadcasting program received through the tuner 10 in a storage medium and allows a viewer to arbitrarily watch a desired part of the stored broadcasting program data after a predetermined time elapses. If a time-shift mode starts, real-time contents (that is, live broadcasting data) are not displayed on a screen but instead are stored in the storage medium. An image displayed on the actual screen is the broadcast recorded by the PVR before a current time.

When the time-shift function is activated, there may be a time difference between a broadcast to be received by a viewer and a broadcast to be actually received. However, the viewer sometimes wants to watch a live broadcast after performing the time-shift mode.

In the above-described case, a current PVR system stops to decode the stored data and decodes broadcasting data from the tuner. At this moment, some broadcasting data cannot be seen by, the viewer because broadcasting data skips by the amount according to the time difference.

Accordingly, there is a problem in that the viewer should rapidly rewind the recorded broadcasting contents or continue to watch the recorded contents using the time-shift function.

Korean Unexamined Patent Application Publication No. 2005-0050456 discloses a digital broadcasting contents recording and reproducing apparatus for time-shift reproduction without time delay including a buffer and a reproduction control unit. Here, when a time-shift reproduction selection signal is received from the outside, the reproduction control unit controls at least a part of contents stored in a recording medium to output to the buffer. Then, when a time-shift reproduction start signal is received from the outside, the reproduction control unit controls such that the part of contents stored in the buffer starts to be reproduced. According to this apparatus, transport streams can be encoded and decoded before the part of contents are stored in the buffer, such that a time delay is minimized during the time-shift reproduction. Therefore, corresponding contents can be rapidly reproduced when a viewer requests the time-shift reproduction. However, the above-described document does not disclose a technique for synchronizing a reproduction time of the time-shifted content (that is, recorded broadcasting contents) with a reproduction time of a real-time content.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for refining a recorded content such that a reproduction time of a content recorded by a time-shift function (for example, recorded broadcasting data) and a reproduction time of a real-time content (for example, live broadcasting data) are synchronized with each other.

According to an aspect of the invention, there is provided an apparatus for synchronizing a reproduction time of a time-shifted content with a reproduction time of a real-time content, the apparatus including a tuner/demodulator which tunes broadcasting signals and demodulates the tuned digital broadcasting signals so as to output the broadcasting signals in forms of transport streams, a demultiplexer which demultiplexes the output transport streams so as to divide the transport streams into video data, audio data, and supplementary information and to output the video data, audio data, and supplementary information, a data refining unit which removes unnecessary frames from the video data and the audio data, and an HDD which stores the video data and audio data, from which the unnecessary frames are removed.

According to another aspect of the invention, there is provided a method of synchronizing a reproduction time of a time-shifted content with a reproduction time of a real-time content, the method including tuning broadcasting signals and demodulating the tuned digital broadcasting signals so as to output the broadcasting signals in forms of transport streams, demultiplexing the output transport streams, dividing the transport streams into video data, audio data, and supplementary information and outputting the divided video data, audio data, and supplementary information, removing unnecessary frames from the video data and the audio data, and synchronously outputting the video data and the audio data, from which the unnecessary frames are removed.

BRIEF DESCRIPTION OF THE DRAWINGS

The above and other aspects, of the present invention will become more apparent by describing in detail exemplary embodiments thereof with reference to the attached drawings, in which:

FIG. 3A is a diagram illustrating the structure of an MPEG-2 TS received by the apparatus for synchronizing a reproduction time of a time-shifted content with a reproduction time of a real-time content according to another exemplary embodiment of the invention;

DETAILED DESCRIPTION OF THE EXEMPLARY EMBODIMENTS OF THE INVENTION

Figure 1:
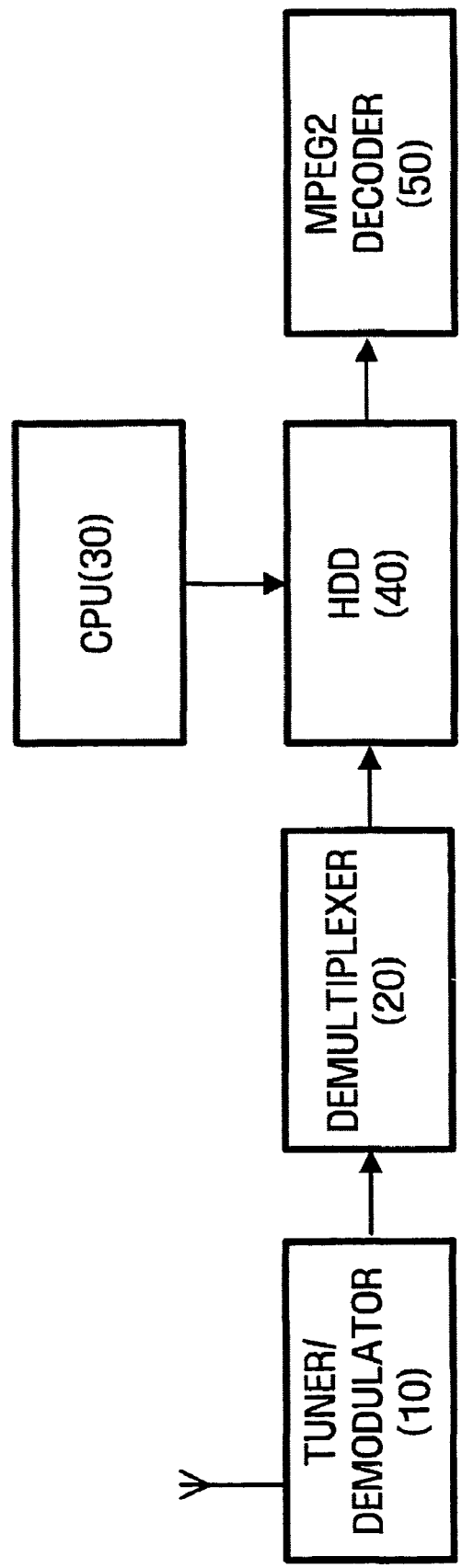
FIG. 1 is a block diagram illustrating a PVR system according to the related art.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like reference numerals refer to like elements throughout the specification.

Figure 2:
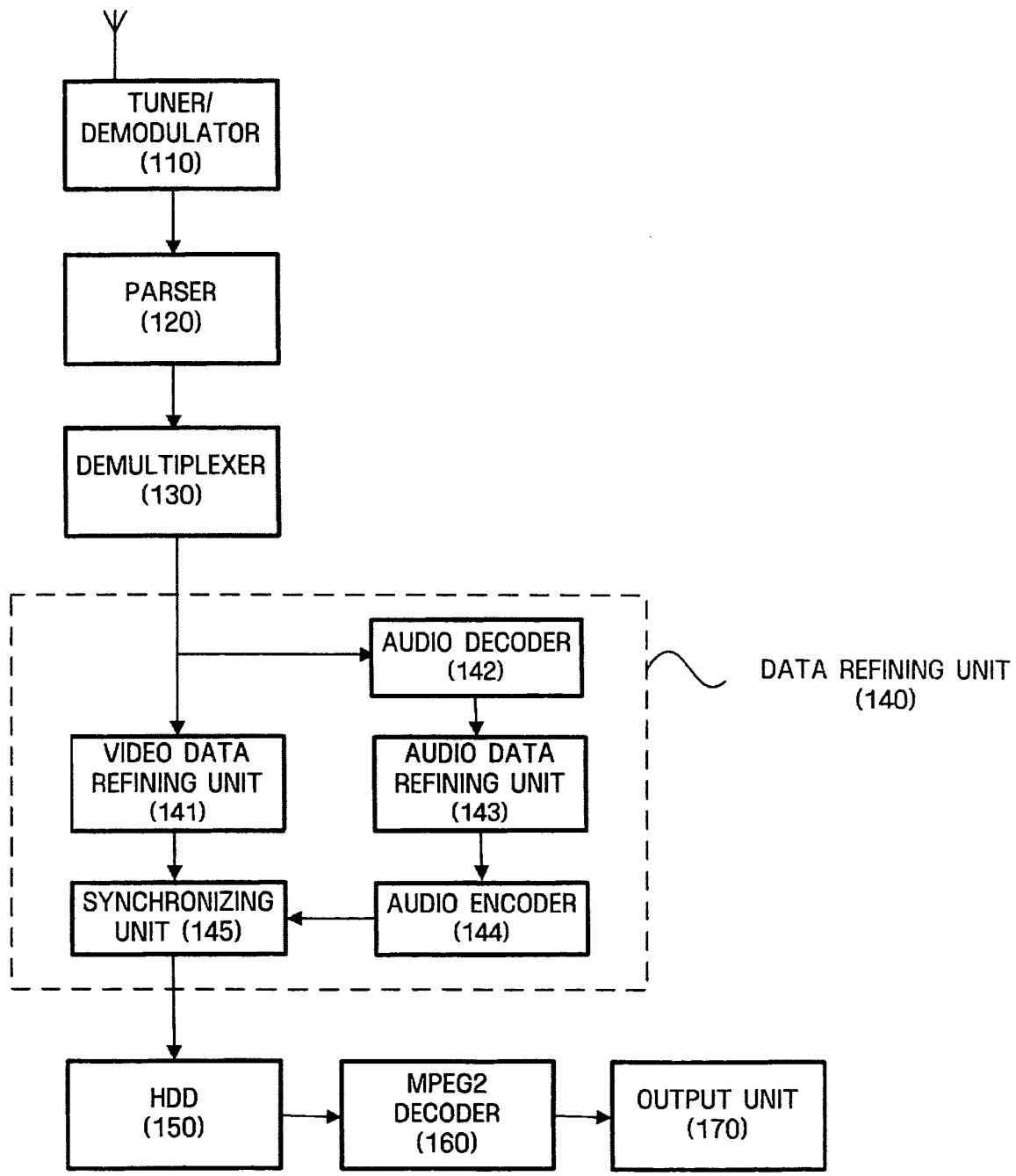
FIG. 2 is a block diagram illustrating an apparatus for synchronizing a reproduction time of a time-shifted content with a reproduction time of a real-time content according to an exemplary embodiment of the invention.

FIG. 2 is a block diagram illustrating an apparatus for synchronizing a reproduction time of a time-shifted content with a reproduction time of a real-time content according to an exemplary embodiment of the invention.

As described in FIG. 2, the apparatus for synchronizing a reproduction time of a time-shifted content with a reproduction time of a real-time content includes a tuner/demodulator 110, a parser 120, a demultiplexer 130, a data refining unit 140, an HDD 150, an MPEG-2 decoder 160, and output unit 170.

In the exemplary embodiments of the present invention, the term "unit" represents software and hardware constituent elements such as a field programmable gate array (FPGA), or an application specific integrated circuit (ASIC). The unit serves to perform some functions but is not limited to software or hardware. The unit may reside in an addressable memory. Alternatively, the unit may be provided to reproduce one or more processors. Therefore, examples of the unit include elements such as software elements, object-oriented software elements, class elements, and task elements, processes, functions, attributes, procedures, subroutines, segments of program code, drivers, firmware, microcode, circuits, data, databases, data structures, tables, arrays, and parameters. The elements and the units may be combined with other elements and units or divided into additional elements and units. In addition, the elements and the units may be provided to reproduce one or more central processing units (CPUs) in a device or a security multimedia card.

The tuner/demodulator 110 tunes broadcasting signals received through an antenna, demodulates the tuned digital broadcasting signals, and outputs the demodulated digital broadcasting signals in forms of transport streams (TS). Here, the broadcasting signals to be transmitted from a broadcasting station are High Definition (HD) or Standard Definition (SD) broadcasting signals.

The parser 120 parses the transport streams converted by the tuner/demodulator 110 and restores frames in the transport streams. Therefore, still images, such as JPEG, can be obtained by restoring the frames through parsing. The demultiplexer 130 divides the parsed frames (video data frame or audio data frame) into video data, audio data, and supplementary information through demultiplexing, and outputs the divided data and information. Here, the supplementary information refers to Electronic Program Guide (EPG) data.

The data refining unit 140 removes (that is, refines) unnecessary frames within the video data and audio data divided by the demultiplexer 130. The data refining unit 140 includes a video data refining unit 141, an audio decoder 142, an audio data refining unit 143, an audio encoder 144, and a synchronizing unit 145.

The video data refining unit 141 removes unnecessary regions (frames) from the received video data. Here, the unnecessary regions of the video data refer to a region including an advertising screen in the video data, a region where a screen is switched, and a region including a still screen. Hereinafter, an example of removing an unnecessary region from the video data will be described with reference to FIGS. 3A and 3B.

The audio decoder 142 decodes the received audio data. Here, the audio data is decoded by a Pulse Code Modulation (PCM) or Audio Coding 3 (AC3) manner.

The audio data refining unit 143 removes unnecessary regions (frames) from the decoded audio data. Here, the unnecessary regions of the decoded audio data refer to a region having an advertising screen in the audio data, a region having no sound in the audio data, or a region having a value less than a predetermined threshold value. Hereinafter, an example of removing an unnecessary region from the audio data will be described with reference to FIGS. 3A and 3B.

The audio encoder 144 encodes the audio data refined by the audio data refining unit 143 again.

The synchronizing unit 145 synchronizes a reproduction time of the refined video data with a reproduction time of the refined audio data. Here, the synchronizing unit 145 includes a time stamp that provides a time field in milliseconds such that the data (that is, video and audio data) refined by the video data refining unit 141 and the audio data refining unit 143 can be synchronously output.

For example, the synchronizing unit 145 compares time information of the refined video and audio data so as to synchronize them with each other. As the comparison result, when the video data is not synchronized with the audio data, the synchronizing unit 145 requests the audio data refining unit 143 for an audio data refinement process. Then, the synchronization of the refined video data and audio data is performed again such that the video data can be exactly synchronized with the audio data.

The HDD 150 stores the video data and the audio data synchronized by the synchronizing unit 145 and stores the supplementary information demultiplexed by the demultiplexer 130.

Further, the HDD 150 may directly store the data (for example, video data, audio data, and supplementary information) divided by the demultiplexer 130.

For example, when a user tries to store unrefined data stored using the time-shift function in the HDD 150, the data refining unit 140 does not perform any operation. Then, the HDD 150 stores the broadcasting data divided by the demultiplexer 130 as it is.

Accordingly, the unrefined data stored using the time-shift function is stored in the HDD 150. Subsequently, the data is refined by the data refining unit 140 before the data is transmitted to the MPEG-2 decoder 160, such that the real-time content (for example, live broadcasting data) can be synchronized with the recorded content with reduction in a time interval.

The MPEG-2 decoder 160 decodes the broadcasting data (for example, video and audio data) stored in the HDD 150 and generates actual Audio/Visual (A/V) images and sound. Here, the MPEG-2 decoder 160 decodes the data according to the MPEG-2 standard for the compression of restored broadcasting signals.

The output unit 170 outputs the A/V images and sound decoded by the MPEG2 decoder 160.

Figure 3B:
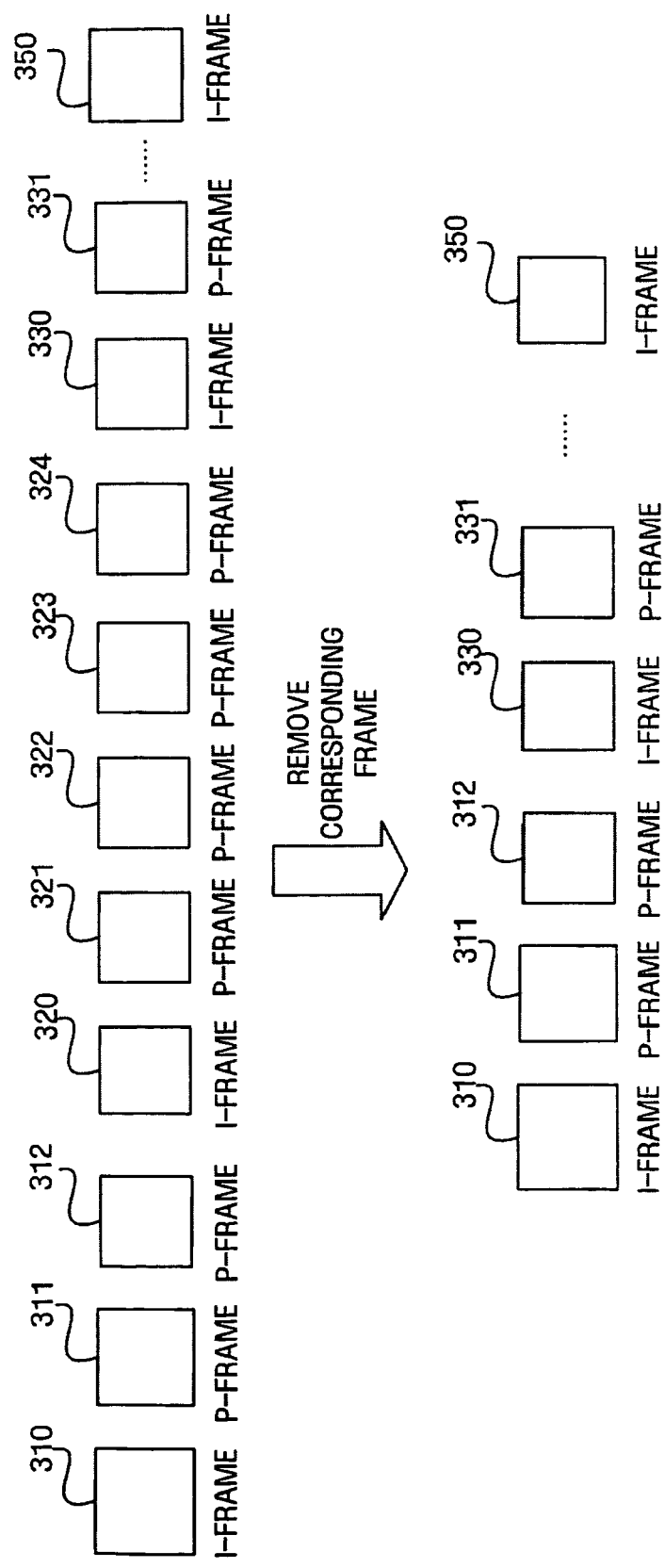
FIG. 3B is a diagram illustrating an example of removing unnecessary frames from video data and audio data according to another exemplary embodiment of the invention.

FIG. 3A illustrates the structure of an MPEG-2 TS received by the apparatus for synchronizing a reproduction time of a time-shifted content with a reproduction time of a real-time content, and FIG. 3B illustrates an example of removing unnecessary frames from the video data and audio data according to another exemplary embodiment of the invention.

As shown in FIG. 3A, the MPEG-2 TS has transport packets having a fixed length of 188 bytes.

That is, each transport packet has a 4-byte packet header and a 184-byte data region. The packet header includes an 8-bit synchronization information, a PID (Packet Identifier) having a 13-bit binary value, and so on.

Further, in the data region, various data (video, audio, and supplementary data) are stored in terms of frames (for example, I-frame or P-frame).

For example, the video data includes a plurality of I-frames and P-frames. The plurality of P-frames are respectively located between predetermined I-frames. Here, the I-frame can be compressed or restored regardless of other frames with the lowest compression ratio. That is, the I-frame can be independently reproduced as a complete still image, such as JPEG Here, "I" represents "Intra".

Further, the P-frame is calculated with reference to a previous frame. That is, the P-frame can be obtained by calculating only a part different from the previous frame upon comparison with the previous frame and encoding the difference value. The P-frame is restored as a still image with reference to the previous I-frame. Here, "P" represents "Predicted".

An example of removing unnecessary frames from the video data by the video data refining unit 141 will be described with reference to FIG. 3B.

The video data refining unit 141 detects an advertising region within the video data on the basis of the received EPG data and removes frames corresponding to the detected advertising region. That is, the video data refining unit 141 removes advertising time zones in terms of I-frames.

For example, as the advertising region detection result, if a predetermined I-frame 320 is a frame including an advertising, the video data refining unit 141 removes all the frames 320 to 324 existing between the I-frame 320 and the next I-frame 330.

Further, the video data refining unit 141 detects a frame whose screen is switched or a frame including a still screen by calculating an energy difference between the I-frames on the basis of frames restored by the parser 120.

For example, when the energy difference between the I-frames is large, the video data refining unit 141 judges that it is the moment when the screen is switched. In this case, even though some of the previous and next frames are removed, watching is not interrupted. Therefore, the video data refining unit 141 removes I-frames having a large energy difference and P-frames therebetween.

That is, as the comparison result of the energy difference between the I-frames, when the I-frame 320 and the next I-frame 330 have large energy values, P-frames 321 to 324 existing between the I-frame 320 and the next I-frame 330 are removed. Here, the frames are arbitrarily removed. For example, the I-frame 320 and the P-frames 321 to 324 may be removed or the I-frame 320 and a P-frame 331 may be removed.

Further, when the energy difference between the I-frames is small, the video data refining unit 141 judges that a still screen is present. In this case, even though some of the previous and next frames are removed, watching is not interrupted. Therefore, the video data refining unit 141 removes the I-frames having small energy differences and the P-frames therebetween.

Meanwhile, since the difference value between the P-frames can be calculated on the basis of the data amount, the refinement process can also be performed in terms of P-frames. Here, the data amount can be recognized from the size of the video data.

For example, as the comparison result of the data amount, when the data amount between the P-frames (for example, the P-frames 321 and 322) is small, the two P-frames (for example, the P-frames 321 and 322) are removed.

Meanwhile, in the detection result of the video data refining unit 141, when an advertising frame in the video data, a frame having a large energy difference between the I-frames, and a frame having a small energy difference between the I-frames are not detected, the video data refining unit 141 removes approximately one-tenth of specific P-frames in a predetermined I-frame. Here, the specific P-frames to be removed are arbitrarily selected. Accordingly, the speed becomes faster by about 1.1 times.

The audio data refining unit 143 detects the advertising region in the video data on the basis of the received EPG data, and removes frames corresponding to the detected advertising region. That is, the audio data refining unit 143 removes all the advertising time zones in terms of I-frames.

In addition, the audio data refining unit 143 searches a voice frequency band on the basis of the decoded audio data and removes frames having no sound or frames in which predetermined sound has a value of a threshold value or less.

Additionally, as the detection result of the audio data refining unit 143, when an advertising frame of the audio data, a frame having no sound, and a frame in which the sound has a value of a threshold value or less are not detected, the audio data refining unit 143 removes approximately one-tenth of specific P-frames in a predetermined I-frame. Here, the specific P-frames to be removed are arbitrarily selected. Therefore, the voice is reproduced faster by approximately 1.1 times.

Figure 4:
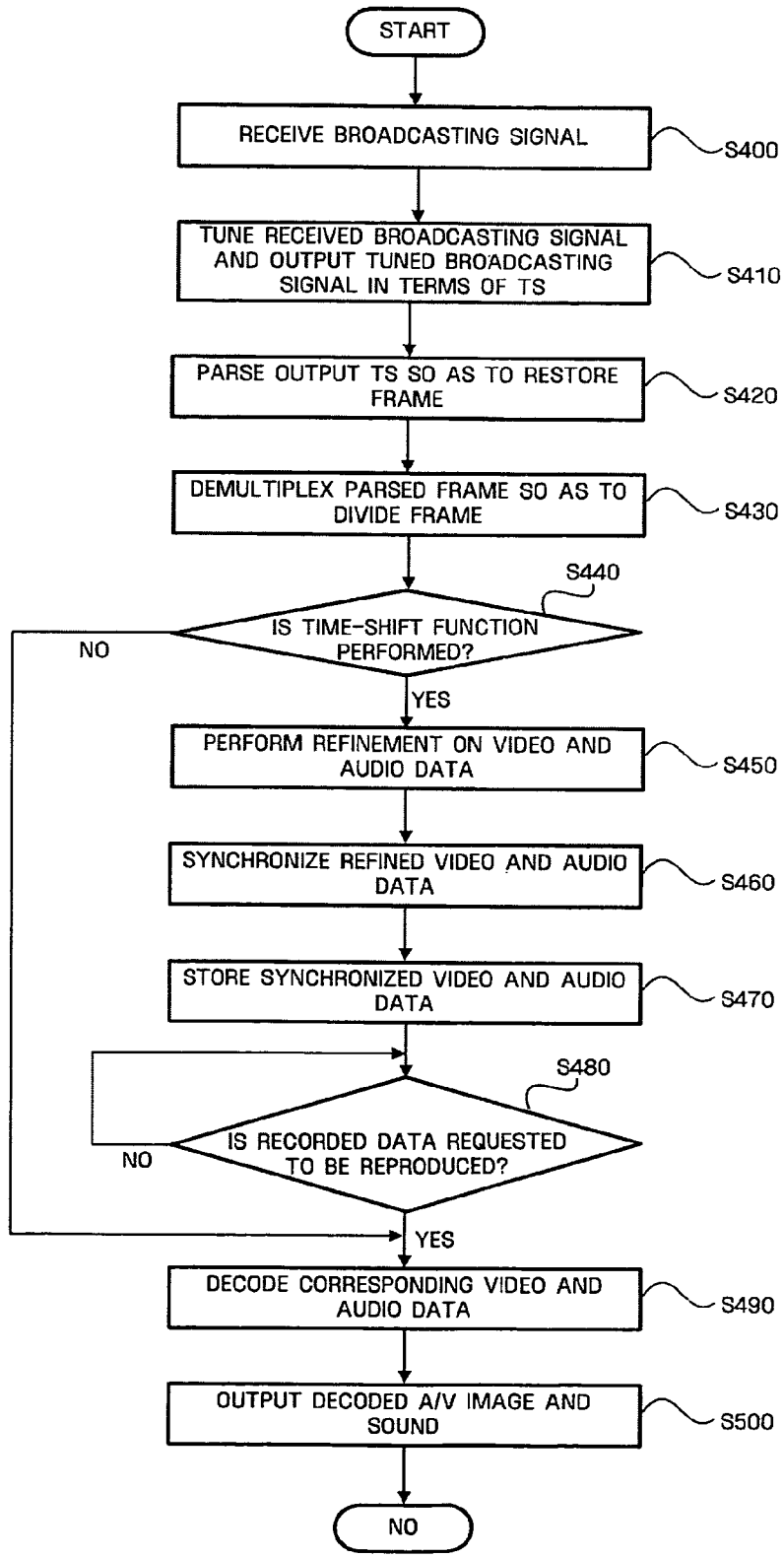
FIG. 4 is a flowchart illustrating a method of synchronizing a reproduction time of a time-shifted content and a reproduction time of a real-time content according to another exemplary embodiment of the invention.

FIG. 4 is a flowchart illustrating a method of synchronizing a reproduction time of a time-shifted content and a reproduction time of a real-time content according to another exemplary embodiment of the invention.

First, when a broadcasting station transmits a broadcasting signal (for example, HD broadcasting signal), the transmitted broadcasting signal is received through an antenna (S400). Next, the transport stream TS is output through the tuner/demodulator 110 (S410).

Next, the parser 120 parses the transport stream TS output through the tuner/demodulator 110 so as to restore data frames (S420). The parsed frames (video data frame and audio data frame) are demultiplexed by the demultiplexer 130 and output after being divided into the video data, the audio data, and the supplementary information (S430).

Next, if the time-shift function is performed when a viewer is absent (S440), the video data refining unit 141 and the audio data refining unit 143 remove unnecessary frames from the divided and output video data and audio data (S450). Here, the unnecessary frames in the video data refer to a frame including an advertising screen, a frame whose screen is switched, and a frame including a still screen. Further, the unnecessary frames in the audio data refer to a frame including an advertising screen, a frame having no voice in the audio data, or a frame having a value of a predetermined threshold value or less. Hereinafter, a process of removing unnecessary frames will be described with reference to FIGS. 5A and 5B.

Next, the video data and audio data whose unnecessary frames are removed by the data refining unit 140 are transmitted to the synchronizing unit 145, and the synchronizing unit 145 synchronizes the refined video data and audio data (S460). Here, the synchronizing unit 145 performs synchronization on the basis of the refined video data and audio data. If the video data is not synchronized with the audio data, the synchronizing unit 145 requests the audio data refining unit 143 to perform a refinement process of the audio data such that the reproduction time of the video data can be exactly synchronized with the reproduction time of the audio data.

Next, the video data and the audio data synchronized by the synchronizing unit 145 are stored in the HDD 150 (S470).

When the viewer requests the contents (that is, video data and audio data) stored by using the time-shift function (S480), the video data and audio data stored in the HDD 150 are transmitted to the MPEG-2 decoder 160 and the transmitted video data and audio data are decoded by the MPEG-2 decoder 160 (S490).

Next, the A/V image and sound decoded by the MPEG2 decoder 160 are output through the output unit 170 (S500).

When the time-shift function is not performed (S440), the video data and audio data divided by the demultiplexer 130 are transmitted to the MPEG-2 decoder 160 and the transmitted video data and audio data are decoded by the MPEG-2 decoder 160 (S490).

Next, the A/V image and sound decoded by the MPEG-2 decoder 160 are output through the output unit 170 (S500).

Accordingly, after watching the recorded content for a while, the viewer can immediately connect and watch the real-time content that is being currently broadcasted.

Figure 5A:
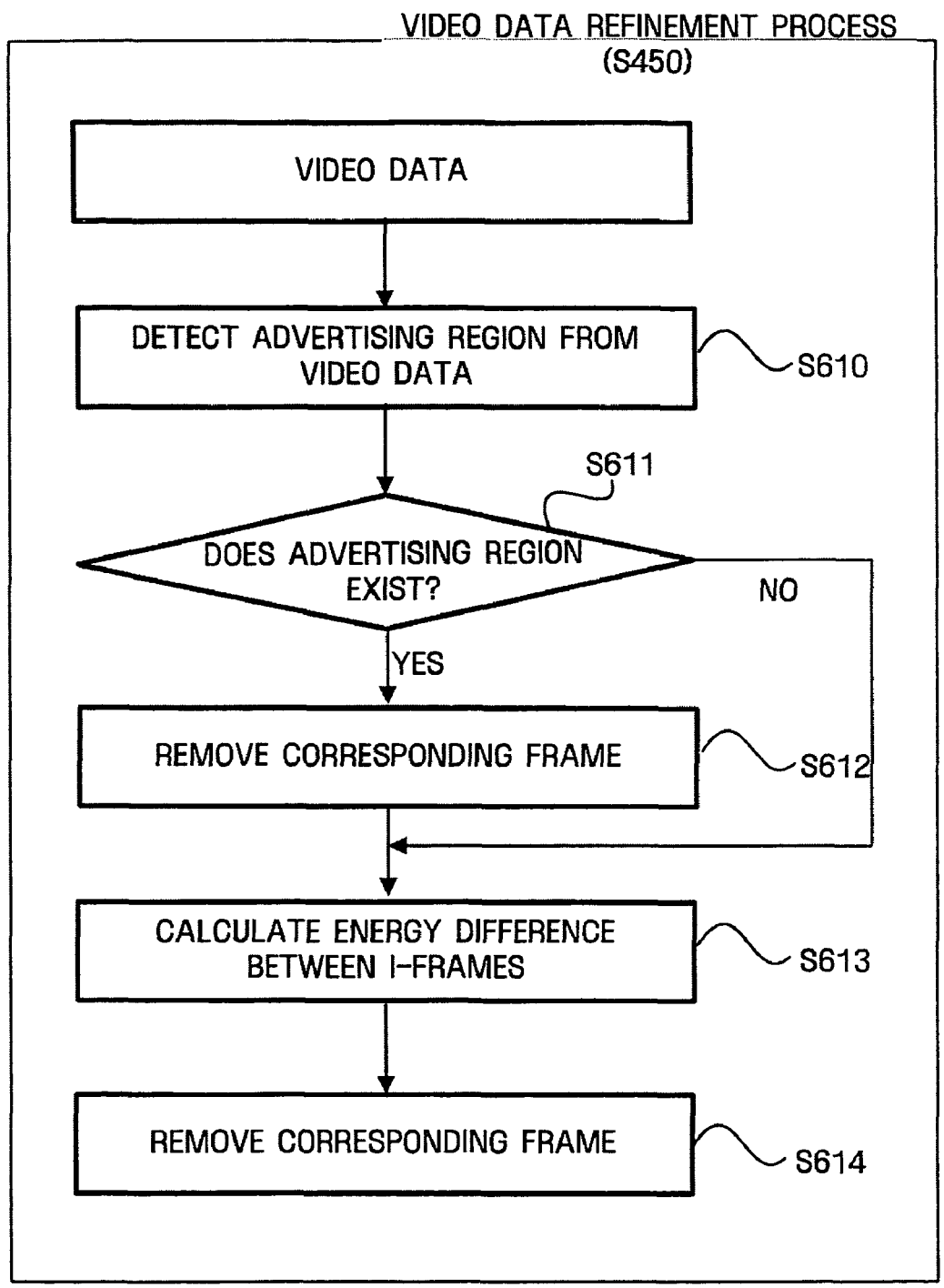
FIGS. 5A and 5B are flowcharts illustrating a process of refining video data and audio data in a method of synchronizing a reproduction time of a time-shifted content with a reproduction time of a real-time content according to another exemplary embodiment of the invention.
Figure 5B:
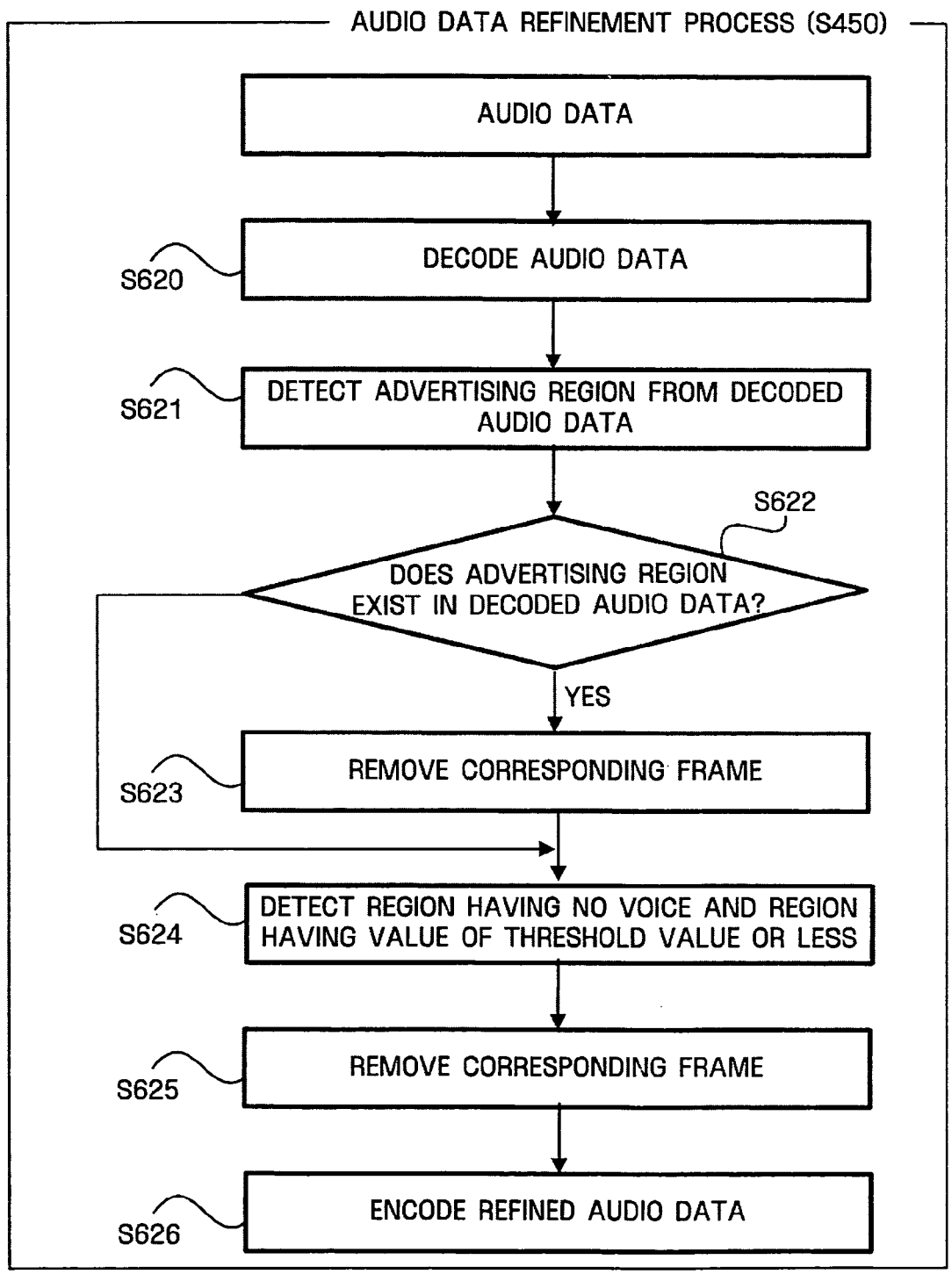

FIGS. 5A and 5B are flowcharts illustrating a process of refining the video data and audio data in a method of synchronizing the reproduction time of the time-shifted content with the reproduction time of the real-time content according to another embodiment of the invention.

The process of refining the video data will be described with reference to FIG. 5A.

First, the video data refining unit 141 detects a region including an advertising screen from the video data divided and output by the demultiplexer 130 (S610) and removes frames corresponding to the detected advertising region (S611 and S612). Here, the advertising region can be detected on the basis of the EPG data.

Next, the video data refining unit 141 calculates an energy difference between the I-frames on the basis of frames restored by the parser 120, detects a frame whose screen is switched or a frame including a still screen, and removes the detected frame (S613 and S614). Since the detailed description thereof has been as described with reference to FIGS. 3A and 3B, it will be omitted.

A process of refining the audio data will be described with reference to FIG. 5B.

First, the audio decoder 142 decodes the audio data divided and output by the demultiplexer 130 (S620) and transmits the decoded audio data to the audio data refining unit 143.

Next, the audio data refining unit 143 detects a region including an advertising screen from the decoded audio data (S621) and removes frames corresponding to the detected advertising region (S622 and S623). Here, the advertising region can be detected on the basis of the EPG data.

Next, the audio data refining unit 143 detects a frame having no voice and a frame in which the voice has a value of a predetermined threshold value or less from the audio data, and removes the detected frames (S624 and S625). Since the detailed description has been described with reference to FIGS. 3A and 3B, it will be omitted.

Next, the audio encoder 144 encodes the refined audio data and transmits the encoded audio data to the synchronizing unit 145 (S626).

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

According to the apparatus and method for synchronizing a reproduction time of a time-shifted content with a reproduction time of a real-time content of the exemplary embodiment of invention, the following effects can be obtained.

The refinement process is performed using the time-shift function such that the reproduction time of the recorded content (for example, recorded broadcasting data) can be synchronized with the reproduction time of the real-time content (for example, real-time data). Therefore, after watching the recorded content for a while, the viewer can immediately watch the real-time content that is being currently broadcasted.

In addition, a viewer's desire to watch the real-time content immediately after watching the recorded content is satisfied. Therefore, differentiation and high quality can be promoted in a PVR market.

What is claimed is:

1. An apparatus for synchronizing a reproduction time of a time-shifted content with a reproduction time of a real-time content, the apparatus comprising:
   a tuner/demodulator which tunes broadcasting signals and demodulates the tuned broadcasting signals so as to output the broadcasting signals in the form of transport streams;
   a demultiplexer which demultiplexes the output transport streams so as to divide the transport streams into separate video data, audio data, and supplementary information, and outputs the video data, audio data, and supplementary information;
   a hard disk drive (HDD) which stores the video data, the audio data, and the supplementary information; and
   a data refining unit which removes:
   determines that a time-shift function of the apparatus is activated;
   when the time-shift function of the apparatus is activated, removes unnecessary frames from the video data and the audio data, as the time-shifted content, output by the demultiplexer, wherein the unnecessary frames are removed to reduce a time difference between the reproduction time of the time-shifted content and the reproduction time of the real-time content; and
   when the time-shift function of the apparatus is activated, synchronizes the video data with the audio data, from which the unnecessary frames are removed.

2. The apparatus of claim 1, wherein the data refining unit further comprises:
   a video data refining unit which removes the unnecessary frames from the video data output by the demultiplexer;
   an audio decoder which decodes the audio data output by the demultiplexer;
   an audio data refining unit which removes the unnecessary frames from the decoded audio data; and
   an audio encoder which encodes the audio data, from which the unnecessary frames are removed.

3. The apparatus of claim 2, wherein the unnecessary frames in the video data comprise an advertising frame, a frame whose screen is switched, or a frame having a still screen.

4. The apparatus of claim 2, wherein the unnecessary frames in the audio data comprise an advertising frame, a frame having no voice, or a frame in which a voice has a value of a predetermined threshold value or less.

5. The apparatus of claim 1, further comprising:
   an MPEG-2 decoder which decodes the video data and the audio data stored in the HDD; and
   an output unit which outputs decoded images and sound.

6. A method of synchronizing a reproduction time of a time-shifted content with a reproduction time of a real-time content, the method comprising:
   tuning broadcasting signals and demodulating the tuned digital broadcasting signals so as to output the broadcasting signals in the form of transport streams;
   demultiplexing the output transport streams so as to divide the transport streams into separate video data, audio data, and supplementary information, and outputting the divided video data, audio data, and supplementary information;
   storing the video data, audio data, and supplementary information; and
   determining that a time-shift function of the apparatus is activated;
   when the time-shift function of the apparatus is activated, removing unnecessary frames from the video data and the audio data, as the time-shifted content, wherein the unnecessary frames are removed to reduce a time difference between the reproduction time of the time-shifted content and the reproduction time of the real-time content; and
   when the time-shift function of the apparatus is activated, synchronously outputting the video data and the audio data from which the unnecessary frames are removed.

7. The method of claim 6, wherein the removing of unnecessary frames comprises:
   decoding the audio data;
   removing the unnecessary frames from the decoded audio data; and
   encoding the audio data from which the unnecessary frames are removed.

8. The method of claim 6, wherein the unnecessary frames in the video data comprise an advertising frame, a frame whose screen is switched, or a frame having a still screen.

9. The method of claim 6, wherein the unnecessary frames in the audio data comprise an advertising frame, a frame having no voice, or a frame in which a voice has a value of a predetermined threshold value or less.

10. The method of claim 6, further comprising parsing the output transport streams so as to restore frames.

11. The apparatus of claim 2, wherein the video data refining unit detects an advertising region within the video data on the basis of received electronic programming guide (EPG) data.

12. The apparatus of claim 2, wherein the audio data refining unit detects an advertising region within the video data on the basis of received electronic programming guide (EPG) data.

13. The apparatus of claim 2, wherein the video data refining unit removes unnecessary video frames between two video frames based on a calculated energy difference between the two video frames.

14. The method of claim 6, wherein the unnecessary frames between two frames in the video data are removed based on a calculated energy difference between the two frames in the video data.

* * * * *